United States Patent [19]

Kramer

[11] Patent Number: 4,520,640
[45] Date of Patent: Jun. 4, 1985

[54] POSITION CONTROL MECHANISM FOR A VEHICLE IGNITION LOCK

[75] Inventor: Richard L. Kramer, Saginaw, Mich.

[73] Assignee: General Motors Corporation, Detroit, Mich.

[21] Appl. No.: 509,403

[22] Filed: Jun. 30, 1983

Related U.S. Application Data

[63] Continuation-in-part of Ser. No. 297,232, Aug. 28, 1981, abandoned.

[51] Int. Cl.³ .............................................. E05B 65/12
[52] U.S. Cl. ..................................................... 70/248
[58] Field of Search ................. 292/252; 70/247, 248, 70/239

[56] References Cited

U.S. PATENT DOCUMENTS

| | | | |
|---|---|---|---|
| 1,762,116 | 6/1930 | Bolles et al. | 70/247 |
| 2,139,193 | 12/1938 | Lamothe et al. | 292/252 |
| 2,147,613 | 2/1939 | Sandberg | 70/239 |
| 3,748,880 | 7/1973 | Atkins | 70/248 |
| 4,232,538 | 11/1980 | Detloff, Jr. | 70/239 |

Primary Examiner—Richard E. Moore
Attorney, Agent, or Firm—Donald F. Scherer

[57] ABSTRACT

A steering column mounted vehicle ignition lock mechanism and a floor-mounted transmission shifter have an interconnecting mechanism which prevents the steering column from being locked unless the transmission shifter is in the "Park" position. This mechanism also prevents the transmission shifter from being moved from the "Park" position when the ignition lock mechanism is in the "Lock" position. The interconnecting mechanism is generally comprised of a pair of slidable pins each cooperating with a housing to form recesses. The pins are moved in response to movement of the vehicle ignition lock and transmission shifter, respectively, so that the recesses will be properly aligned for movement of a latching member upon predetermined positioning of the slidable pins.

5 Claims, 3 Drawing Figures

POSITION CONTROL MECHANISM FOR A VEHICLE IGNITION LOCK

This is a Continuation-in-Part application of U.S. Ser. No. 297,232, filed Aug. 28, 1981, now abandoned, and assigned to the assignee of the present invention.

This invention relates to positioning control mechanisms and more particularly to such mechanisms used with vehicle ignition locks and requiring the cooperation of two spaced members.

It is well-known to provide a mechanism for a steering column mounted ignition lock and transmission shift mechanism which prevents the ignition lock from being placed in the "Lock" position unless the shift lever has been moved to the "Park" position. With the use of a floor-mounted transmission shift lever, it is generally the custom to utilize a backdrive mechanism similar to the previously known transmission shift control mechanisms thereby providing a mechanical connection between the transmission shift lever and the steering column. The backdrive mechanism can be interconnected with the ignition mechanism utilizing the previously known structures. It is also possible to use a position control mechanism such as that shown in U.S. Pat. No. 4,232,538 issued to Detloff, Jr. Nov. 11, 1980. This mechanism makes use of the previously known backdrive mechanisms but incorporates a unique pin and slot connection.

The present invention seeks to eliminate the previously used rotary tube backdrive mechanisms and substitute therefore a simple Bowden wire or cable mechanism. The cable mechanism operates a slidable pin member which is disposed in a housing for reciprocation parallel to a pin which is actuated by the ignition lock mechanism. These pins are positionable in response to transmission ratio selection and ignition lock movement, respectively, and are interconnected by a latching ball which requires predetermined selection patterns. These patterns require that the transmission be placed in the "Park" position prior to the ignition lock being moved to the "Lock" position. It is well-known that in many ignition lock mechanisms, the key cannot be removed until the "Lock" position has been attained. Once this position has been reached, the transmission selector lever cannot be moved from the "Park" position until the ignition lock mechanism has been moved from the "Lock" position.

It is an object of this invention to provide an improved connecting mechanism between the floor-mounted transmission lever and a steering column mounted ignition lock mechanism which connecting mechanism requires the transmission to be shifted to the "Park" position before the ignition locking mechanism can be locked and also prevents shifting of the transmission from the "Park" position if the ignition locking mechanism is in the "Lock" position.

It is a another object of this invention to provide an improved position-controlled mechanism for interconnecting a steering column mounted ignition lock mechanism and a floor-mounted transmission shift control mechanism wherein the position control mechanism incorporates a pair of sliding pin members which respond to ignition lock movement and transmission ratio selection respectively, and which pins are interconnected by a ball latching mechanism requiring a predetermined sequence of movements if ignition locking is desired.

It is a further object of this invention to provide an improved position-controlled mechanism for interconnecting a steering column mounted ignition lock mechanism and a floor-mounted transmission shift control mechanism wherein the position control mechanism incorporates a pair of selectively operable sliding members which respond to ignition lock movement and transmission ratio selection respectively and cooperates with a surrounding housing to form a pair of recesses and which members are interconnected by a latching mechanism such that a predetermined sequence of movements is required if ignition locking is to be accomplished.

These and other objects and advantages of the present invention will be more apparent from the following description and drawings in which.

Figure 1:
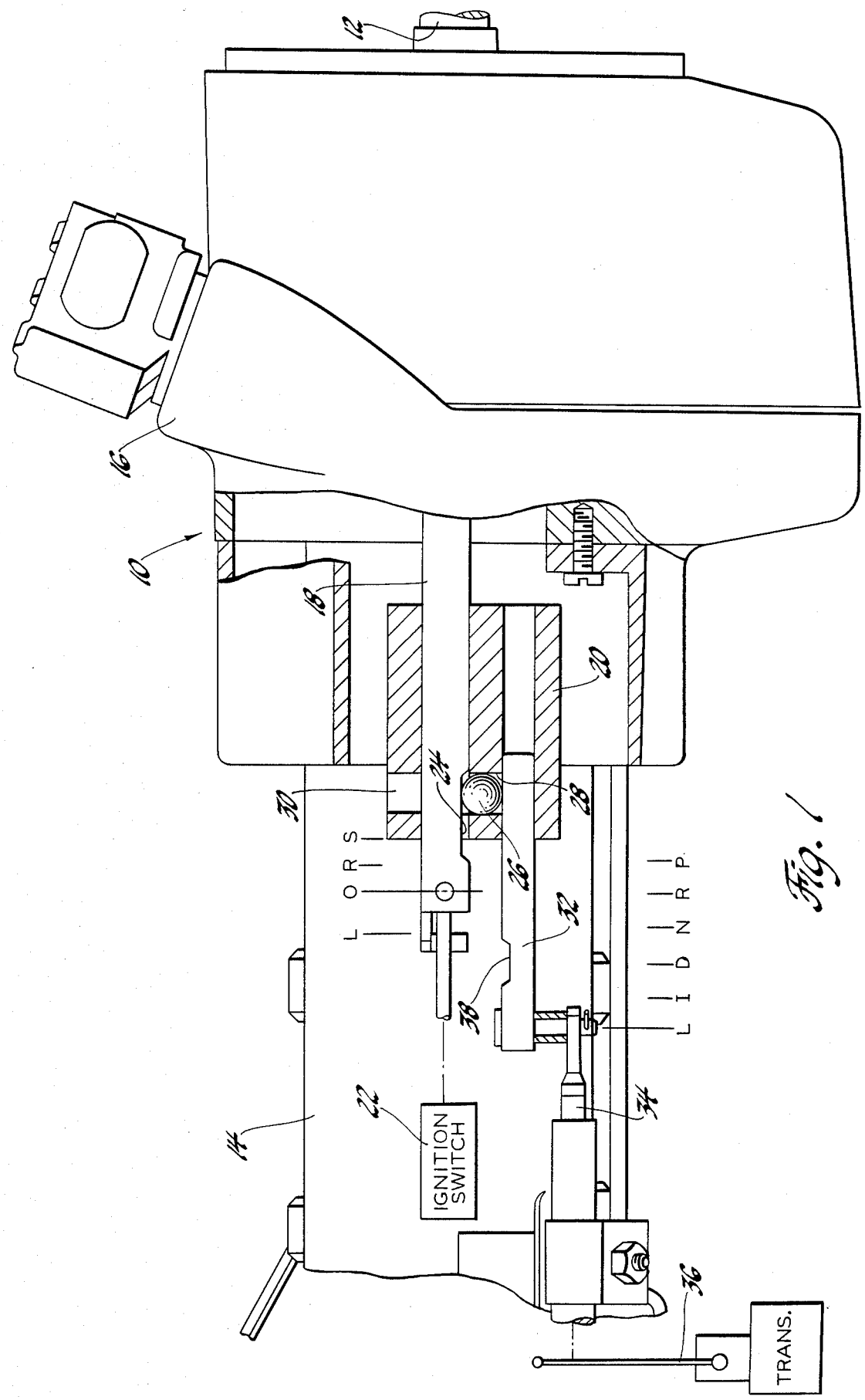
FIG. 1 is an elevational view partly in section of a portion of a vehicle steering column and diagrammatic representation of a transmission shift mechanism incorporating one embodiment of the invention.

Referring to FIG. 1 of the drawings, there is seen a steering column, generally designated 10, which rotatably supports a steering shaft 12 which extends longitudinally through a mast jacket 14 to be connected in a conventional manner with a steering gear. The steering column 10 also includes an ignition lock mechanism 16 which may be constructed in accordance with the lock mechanism shown in U.S. Pat. No. 3,648,490 issued to Kimberlin et al. Mar. 14, 1972. The ignition lock mechanism operates an ignition pin 18 which is slidably mounted in a guide member or housing 20.

The ignition pin 18 is connected to a conventional ignition switch 22 and in response to movement of the lock mechanism 16 is positionable in a "Lock" position "L", an "Off" position "O", a "Run" position "R" and a "Start" position "S". These are the conventional positions for most ignition lock mechanisms. Other positions, such as an accessory operation position, can also be accommodated.

The ignition pin 18 has formed therein a lock recess 24 which, as seen in the drawing, will accommodate a portion of a latching ball 26 which is disposed in an opening 28 formed in the guide member 20. The opening 28 extends to the outer surface of guide member 20 as shown at 30, to permit assembly of the latching ball 26 prior to the insertion of ignition pin 18 into the guide member 20. The recess 24 extends for a predetermined longitudinal dimension of pin 18 so that the recess 24 can accommodate the ball 26 in the "O", "R" and "S" positions of lock mechanism 16. The recess 24 will not accommodate ball 26 when the igntion pin 18 is moved to the "L" or "Lock" position by the ignition lock mechanism 16.

Also slidably disposed in the guide member 20 is a transmission shift pin 32 which is connected by a backdrive cable 34 to a floor-mounted transmission shift control lever 36. The transmission shift control lever 36 may be constructed in accordance with the teaching of U.S. Pat. No. 4,249,404 issued to Kimberlin Feb. 10, 1981. As is well-known, transmission shift control levers are movable to provide a plurality of transmission ratio selections such as Lock "L", Intermediate "I", Drive "D", Neutral "N", Reverse "R" and Park "P". Both Park "P" and Neutral "N" are non-drive selections. The Park "P" position is selected when mechanical latching of the transmission output shaft is desired. This is the position that is selected by the operator prior to leaving the vehicle. It is also the time at which the ignition key is removed from the ignition lock mechanism.

The shift pin 32 is movable with the backdrive cable 34 by the transmission control lever 36 and therefore obtains the same positions which the operator selects for the transmission. The transmission pin 32 has a park recess 38 which is alignable with the latching ball 26 when the transmission lever 36 and therefore shift pin 32 are in the "P" or Park position. In the "P" position, the park recess 38 will accommodate a portion of the latching ball 26 in a manner similar to that described above for the lock recess 24. Therefore, when the shift pin 32 is in the "P" position and the ignition pin 18 is in the "O", "R" or "S" position, the latching ball 26 is freely movable in opening 28 between the recesses 24 and 38. However, if the shift pin 32 is in a position other than "P", the igniion pin 18 and therefore lock mechanism 16 cannot be moved to the "L" position and with most mechanisms, the operator will not be able to remove the ignition key. If the transmission shift pin 32 is in the "P" position, the ignition pin 18 can be moved to the "L" position and the ignition key can be removed. If the ignition pin 18 is retained in the "L" position, the transmission shift pin cannot be moved from the "P" position since the latching ball 26 cannot be removed from recess 38 due to the presence of the unrecessed surface of ignition pin 18. Therefore, it is necessary to move the ignition pin 18 from the lock position so that recess 24 can accept ball 26, prior to moving the transmission from the "P" position.

Since it is desirable to start the vehicle engine only when the transmission is in Neutral "N" or Park "P", a conventional Neutral/Start switch can be incorporated in the transmission or positioned for operation in conjunction with the backdrive cable 34. Such Neutral/Start mechanisms are well-known.

With the present invention, it should be noted that the ignition lock mechanism 16 cannot be moved to a locking position prior to the transmission being moved to the "Park" position and, subsequent to ignition locking procedure, the transmission cannot be removed from the "Park" position until the ignition lock mechanism 16 is moved to a position other than "L".

Figure 2:
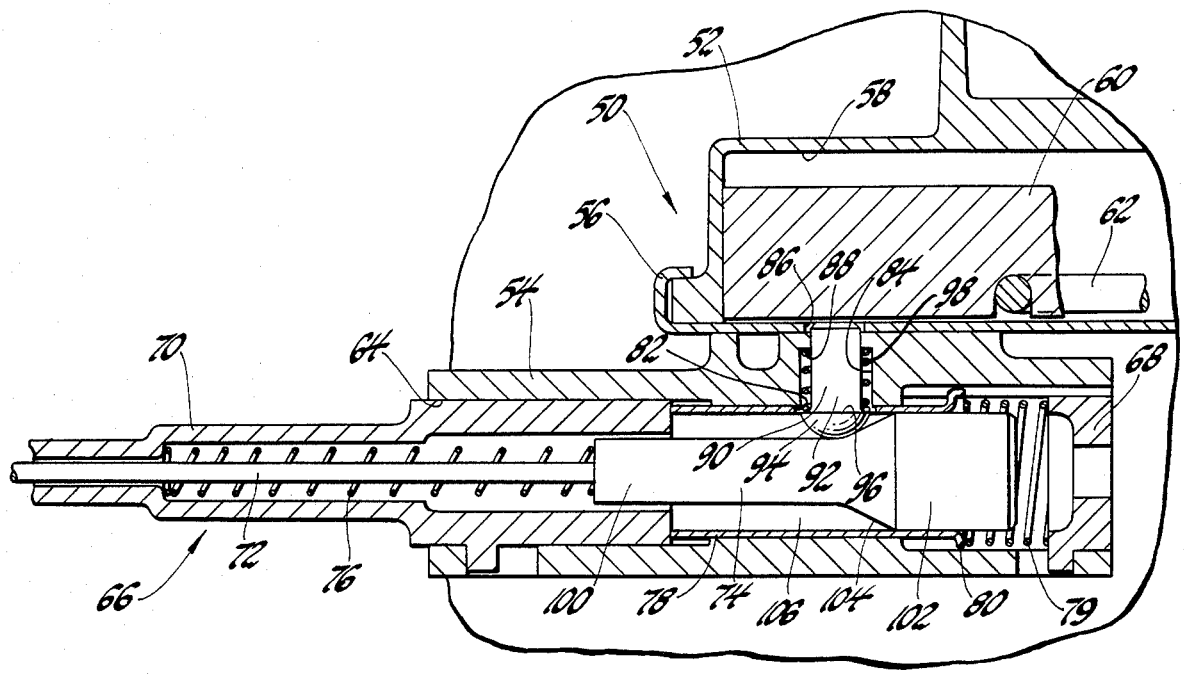
FIG. 2 is a sectional view of another embodiment of the invention.
Figure 3:
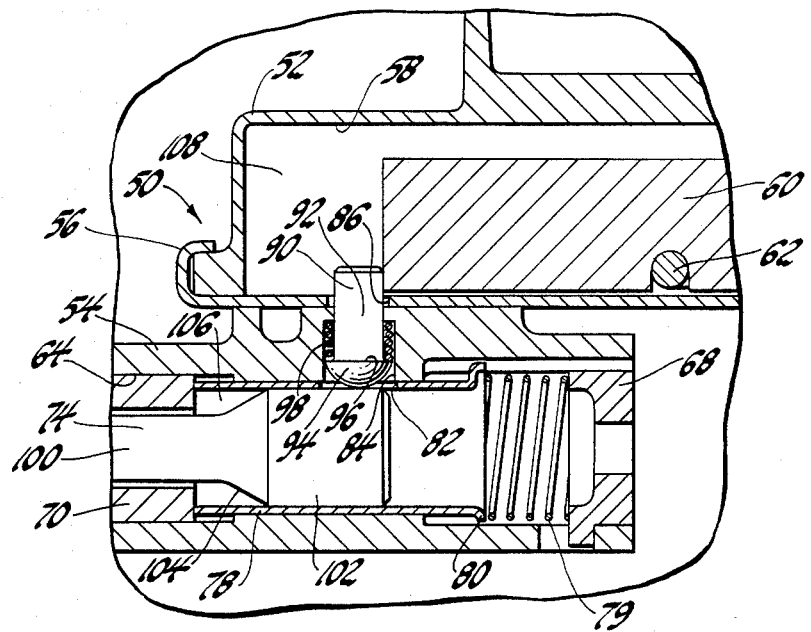
FIG. 3 is a view similar to FIG. 2 showing the embodiment in another operating position.

The alternate embodiment shown in FIGS. 2 and 3 includes a two-piece housing or guide member, generally designated 50. The guide member 50 is separated into an upper housing 52 and a lower housing 54. The upper housing 52 also includes a separator plate 56. The upper housing 52 has formed therein an opening 58 in which is slidably disposed an ignition pin 60 controlled by a rod 62 which in turn is connected to the ignition switch and ignition lock, not shown.

The lower housing 54 has an axially extending opening 64 which has installed at one end thereof a backdrive cable assembly 66. The other end of opening 64 is closed by a cap or plug member 68. The backdrive cable assembly 66 has a sheath member 70 and a cable portion 72. The sheath portion 70 is secured to the lower housing 54 and the cable 72 is freely slidably within the sheath 70.

The cable 72 has secured thereto a transmission shifter pin 74. The shifter pin 74 is urged rightward in the opening 64 by a compression spring 76 which is compressed between a portion of the sheath 70 and the left end of shifter pin 74. The shifter pin 74 is slidably disposed in a tubular member 78 which is urged leftward in opening 64 into abutment with the end of sheath 70 by a compression spring 79 disposed between end cap 68 and a shoulder 80 which is formed on the right end of tubular member 78.

The tubular member 78 has formed therein an aperture 82 which, in FIGS. 2 and 3, is axially aligned with an aperture 84 in housing 54 and an aperture 86 in separator plate 56. The opening 84 has a stepped diameter profile such that a shoulder 88 is formed therein.

A latch pin 90 is disposed in the openings 82, 84 and 86. The latch pin has a longitudinally extending cylindrical body 92 and a substantially spherical head portion 94 which cooperates with the cylindrical portion 92 to form a shoulder portion 96. A compression spring 98 is disposed between the shoulder 96 and shoulder 88 and is operative to urge the spherical end 94 into abutment with the transmission shifter pin 74.

The transmission shifter pin 74 has a small diameter portion 100 and a large diameter portion 102 which are connected by a substantially conical section 104. The small diameter portion 100 cooperates with the housing 54 and tubular member 78 to form a park recess 106.

As seen in FIG. 2, the latch pin 90 is urged into the recess 106 by the spring 98 when the transmission shifter pin 74 is in the position shown or in the positions rightward thereof. When the latch pin 90 is in the position shown in FIG. 2, the upper end of cylindrical portion 92 is flush with or slightly below the surface of separator plate 56. This permits the ignition pin 60 to be moved to the position shown in FIG. 2.

In FIG. 2, the transmission is conditioned for Park "P" and the ignition is conditioned for Lock "L". The latch pin 90 prevents the transmission shifter pin and therefore the transmission shift lever from being moved from the Park "P" position prior to the ignition pin being moved from the Lock position.

In FIG. 3, the ignition pin 60 is shown in the Off position and as can be seen, cooperates with the upper housing 52 and separator plate 56 to form a lock recess 108. When the ignition pin 60 is in the Off position, shown in FIG. 3, or positions rightward thereof, which as indicated in FIG. 1 are Run "R" and Start "S", the opening 86 in plate 56 is opened to the lock recess 108 such that the latch pin 90 can be moved upward.

When the ignition pin 60 is moved from the lock position, movement of the transmission shifter pin from the Park position can be accomplished. Movement of the transmission shifter pin 74 results in the latch pin 90 being moved upwardly by the conical section 104 against the force in spring 98. As shown by FIG. 1, the shifter pin 74 can be moved to Reverse, Neutral, Drive, Intermediate and Low positions. In FIG. 3, the transmission shifter pin 74 is in the Intermediate position.

As seen in FIG. 3, the shifter pin 90 extends upwardly into the lock recess 108. This prevents the ignition pin 60 from being moved to the Lock position, thus preventing locking of the ignition when the transmission shifter pin is not in the Park position.

If the backdrive cable assembly is removed from the housing 54, the tubular member 78 can be urged leftwardly by the spring 79. If this occurs, the opening 82 will no longer be aligned with latch pin 90 such that the latch pin 90 will be maintained in the position shown in FIG. 3 by the outer cylindrical surface of tubular member 78. With the latch pin in this condition, the ignition lock mechanism cannot be conditioned to the Lock position and removal of the key is impossible. This condition will inform the vehicle operator that a malfunction has occured and the vehicle should be repaired.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A position control mechanism, a steering column, a steering column mounted ignition lock cylinder mechanism and a floor-mounted transmission shift control mechanism, said position control mechanism comprising; a guide member secured to the steering column, an ignition pin member slidably disposed in said guide member and cooperating therewith to form an axially extending lock recess and being movable to a plurality of positions including "Lock" by the ignition lock mechanism, a shift pin member sidaby disposed in said guide member and cooperating therewith to form an axially extending park recess selectively alignable with the lock recess and being movable to a plurality of positions including "Park" by the transmission shift control mechanism, and interlock means disposed in said guide member and being engaged in the lock recess in the ignition pin for preventing the ignition pin from moving to the "Lock" position unless the park recess is engaged, being engaged in the park recess in the shift pin when the shift pin is in the "Park" position for preventing movement of the shift pin from the "Park" position when the ignition pin is in the "Lock" position, and being movable between the recesses when the ignition pin is out of the "Lock" position and the shift pin is in the "Park" position.

2. A position control mechanism, a steering column, a steering column mounted ignition lock cylinder mechanism and a floor-mounted transmission shift control mechanism, said position control mechanism comprising; a guide member secured to the steering column, an ignition pin member slidably disposed in said guide member including an axially extending lock recess and being movable to a plurality of positions including "Lock" by the ignition lock mechanism, a shift pin member slidably disposed in said guide member including an axially extending park recess facing the lock recess in the ignition pin member and being movable to a plurality of positions including "Park" by the transmission shift control mechanism, and interlock means disposed in said guide member and being engaged in the lock recess in the ignition pin for preventing the ignition pin from moving to the "Lock" position unless the park recess is engaged, being engaged in the park recess in the shift pin when the shift pin is in the "Park" position for preventing movement of the shift pin from the "Park" position when the ignition pin is in the "Lock" position, and being movable between the recesses when the ignition pin is out of the "Lock" position and the shift pin is in the "Park" position.

3. A position control mechanism, a steering column, a steering column mounted ignition lock cylinder mechanism and a floor-mounted transmission shift control mechanism, said position control mechanism comprising; a guide member secured to the steering column, an ignition pin member slidably disposed in said guide member including an axially extending lock recess and being movable to a plurality of positions including "Lock" by the ignition lock mechanism, a shift pin member slidably disposed in said guide member including an axially extending park recess facing the lock recess in the ignition pin member and being movable to a plurality of positions including "Park" by the transmission shift control mechanism, and interlock means comprised of a ball disposed in an opening in said guide member, a portion of said ball being engaged in the lock recess in the ignition pin for preventing the ignition pin from moving to the "Lock" position unless the park recess is engaged, a portion of said ball being engaged in the park recess in the shift pin when the shift pin is in the "Park" position for preventing movement of the shift pin from the "Park" position when the ignition pin is in the "Lock" position, and said ball being movable between the recesses when the ignition pin is out of the "Lock" position and the shift pin is in the "Park" position.

4. The position control mechanism of claim 1 wherein said interlock means comprises a latching pin and a spring member which urges said latching pin toward said transmission shifter pin.

5. The position control mechanism of claim 1 wherein said guide member is comprised of two housing members for housing respective ones of said shift pin and said ignition pin, said housing members having axially aligned openings, said interlock means including a pin member disposed in said openings and a spring urging said pin member toward said shift pin.

* * * * *